United States Patent

Rustige

[19]

[11] Patent Number: 6,134,542

[45] Date of Patent: Oct. 17, 2000

[54] DATABASE MANAGEMENT SYSTEM AND DATA TRANSMISSION METHOD

[76] Inventor: Hayno Rustige, Ziegelstrasse 21, D-74420 Oberrot, Germany

[21] Appl. No.: 09/051,822

[22] PCT Filed: Oct. 11, 1996

[86] PCT No.: PCT/EP96/04448

§ 371 Date: Oct. 29, 1998

§ 102(e) Date: Oct. 29, 1998

[87] PCT Pub. No.: WO97/15016

PCT Pub. Date: Apr. 24, 1997

[30] Foreign Application Priority Data

Oct. 16, 1995 [DE] Germany .......................... 195 38 448

[51] Int. Cl.[7] .................................................... G06F 15/40
[52] U.S. Cl. ................................ 707/2; 707/1; 707/509
[58] Field of Search ................................ 707/2, 204, 1, 707/102, 103, 104, 203, 509

[56] References Cited

U.S. PATENT DOCUMENTS

| | | | |
|---|---|---|---|
| 5,241,648 | 8/1993 | Cheng et al. ................................. | 707/7 |
| 5,403,639 | 4/1995 | Belsan et al. ............................ | 707/204 |
| 5,588,148 | 12/1996 | Landis et al. ............................... | 707/1 |

FOREIGN PATENT DOCUMENTS 0 336 586  10/1989  European Pat. Off. ........ G06F 15/40

OTHER PUBLICATIONS

Schlatter, M., Furegati, R., Jeger, F., Schneider, H., Streckeisen, H., *The Business Object Management System*, IBM Systems Journal, vol. 33, No. 2, 1994, pp. 239–263.

*Primary Examiner*—Thomas G. Black
*Assistant Examiner*—Sanjiv Shah
*Attorney, Agent, or Firm*—Christie, Parker & Hale, LLP

[57] ABSTRACT

Database management system for managing the storage of data and retrieval of stored data, wherein data sets are stored in a table storage means, and wherein data sets which can have a varying number of occupied fields and different declarations for the occupied fields are stored in a common table, and each data set has a definition field which within the common table characterizes the fields valid for the corresponding data set, as well as the field declarations established for the valid fields, wherein particular general information types are allocated to the individual columns of the common table, so that fields of different types of data sets, which jointly relate to a particular general information type, are stored in the same column of the table.

7 Claims, 6 Drawing Sheets

| | | prefix | | tel | fax |
|---|---|---|---|---|---|
| | ........ area ........ | area code | | tel | fax |
| | | street | | resident | |
| | | place | | resident | |
| | | zip code | | resident | |
| | time | time | | entry date | resident since |
| lingua DB example | verb/ abstracta | verb/ table | format | person. data address | |
| | dimension | classes | | defin. data field name | |

|  |  |  |  |  | resident since |  |  |
|---|---|---|---|---|---|---|---|
| tel int. |  |  | born |  | birth date |  |  |
|  |  | Ziegel-str.21 | Oberrot | 74420 | 20.09.1995 | person. data address | data set |
| "8395 | "07977 |  |  |  |  |  |  |
| "8014 | "07977 |  |  |  | 01.08.1995 |  |  |
|  |  |  | Stuttgart |  | 20.11.1947 |  |  |

| Di-men-sion | verb/ab-stracta | time | ...... | area | | | | | | ...... | (legal) per-sons |
|---|---|---|---|---|---|---|---|---|---|---|---|
| | | | | zip code | place | street | area code | prefix | inter-net | | |
| classes | verb/table | time | ...... | zip code | place | street | area code | prefix | inter-net | ...... | (legal) per-sons |
| defini-tion data field names | order | order date | | | | | | | | | cus-tomer |
| | | de-livery date | | | | | | | | | sup-plier |
| data set | order | 01.01.1995 | | | | | | | | | TDI GmbH |
| | | 01.02.1995 | | | | | | | | | Muller |

| person | | concreta/things/... | | article... | attribute | sizes/ | value | retrieval of foreign files |
|---|---|---|---|---|---|---|---|---|
| first names | sex | discreta: things animals plant | materials | ID | characteristics | phys. dim. & currency | scalar | percentage | file |
| customer | | | material | ID | purity degree | unit | quantity | discount |
| supplier | | | | | | currency | | |
| | | bolts | AlMg | 1274 | 99 % | pieces | 240 | 10 % |
| Erwin | male | | | | | DM | 2.5 | |

⎫ 5  ⎫ 6

DATABASE MANAGEMENT SYSTEM AND DATA TRANSMISSION METHOD

BACKGROUND OF THE INVENTION

The present invention relates to a database management system and to a method of transmitting different types of data sets.

Today's standard databases normally work in a relational manner, i.e. data which are stored in different tables are linked by defining so-called key fields by which connections can be established between data sets that are stored in different tables.

Whenever there are many different tables, the provision of a multitude of different tables or "files" within a database and their linkage via key fields make the structure of the database complicated, whereby work with the database is rendered difficult.

Furthermore, when data sets are transmitted between a transmitter and a receiver, the difficulty arises that the receiver must be in a position to correctly sense the type and structure of the individual data sets transmitted, so that after a possibly necessary restructuring the individual data sets received can be stored in a table which is suited therefor.

SUMMARY OF THE INVENTION

It is the object of the present invention to provide a database management system and a method of transmitting different types of data sets with the aid of which the said problems can be overcome.

This object is achieved in an inventive manner by the subject matter of claim 1 and the subject matter of claim 5.

Preferred developments of the invention are the subject matter of the subclaims.

BRIEF DESCRIPTION OF THE DRAWINGS

FIG. 1A illustrates an upper left portion of a first table;

FIG. 1C illustrates a lower left portion of the first table;

FIG. 2A illustrates a left portion of a second table; and

FIG. 2B illustrates a right portion of the second table.

DETAILED DESCRIPTION OF THE PREFERRED EMBODIMENTS

Figure 1B:
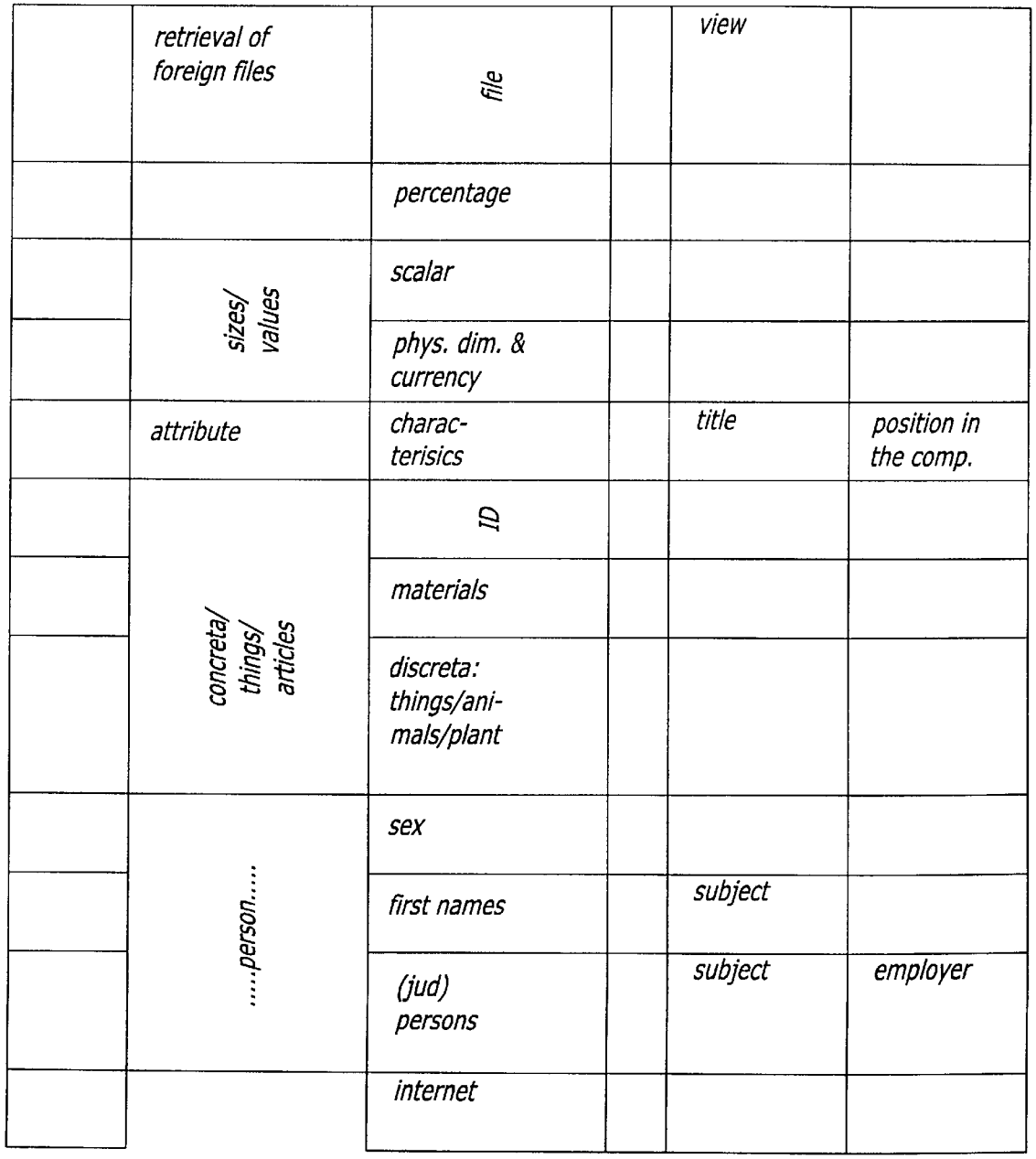
FIG. 1B illustrates an upper right portion of the first table.

The suggested database management system is based on the finding that it is disadvantageous to store different types of data sets, such as bookkeeping data, order data, address data, etc. in different tables, with a connection between the individual types of data sets being only achievable via so-called key fields. According to the present invention it is therefore suggested that only a single common table should be provided for storing all of the different types of data sets. To be able to recognize for each data set, despite a joint storage within a single table, which type of information is stored in the corresponding fields, each data set has a definition field which throws light on the fields valid for a specific data set within the table, and on the types of information stored therein.

In illustrative words, particular general information types are preferably allocated to individual columns of the table, so that fields of different data set types, which, however, jointly refer to a particular general information type, are stored in the same column of the table. Hence, it is not absolutely necessary that each individual field is completely described via the definition field of a data set, but it is possible to draw conclusions already from the allocation of a specific field of a data set to a specific column of the table, as to the type of information stored in the specific field while the data set is being read out.

Preferably, the individual data sets are organizationally structured in a plurality of columns such that the fields within a column of a data set are allocated to a common general information type, such as time, person, place, etc. A more exact field declaration for the fields of such a column is then again made via the definition field. This will be explained in more detail with reference to FIGS. 1 and 2.

Preferably, the definition field which is designated as "verb" in the embodiment described in the following text just represents a reference to an entry in a further table in which the complete field description is stored for the corresponding data set. However, it is also possible that the field declaration information addressed by the definition field again respresents a data set of the common table.

Moreover, the control information required for the database management system can be stored in the form of data sets in the common table, so that the additional tables which, otherwise, are normally required for control are not needed. Furthermore, search criteria in the form of data sets can also be stored in the common table.

According to the indicated transmission method different data set types are each transmitted with definition field data characterizing the corresponding data set type. Unless they already exist, these definition field types must be generated for each individual data set prior to transmission. At the receiver side, each individual data set can be analyzed, by evaluating the corresponding definition field types, as to its structure, i.e. for instance with respect to the number of fields and with respect to the types of information stored in the individual fields, and can subsequently be stored. Storage is preferably performed again in a common table, so that different data set types are jointly stored in this common field. To this end, and prior to storage, a corresponding definition field is generated on the basis of the definition field data pertaining to a specific data set, unless the definition field data themselves can already be used therefor. Preferably, storage is performed in a manner as has been described further above with respect to the database management system.

In a particularly preferred embodiment, the transmitted data sets themselves already represent the data sets suited for storage in the common table.

For a better understanding of the present invention, it will be explained in the following text with reference to the attached FIGS. 1 and 2 by way of exemplary data sets how different types of data sets can be stored in a common table.

Figure 1D:
FIG. 1D illustrates a lower right portion of the first table.

In FIG. 1, reference numeral 1 gives an example of an address data set.

The meaning of the individual occupied fields follows from the field declaration indicated by reference numeral 2. The field declaration is defined by the definition field 4 designated as "verb/abstracta". Hence, it can always be recognized in a data set 1 which additionally comprises a definition field 4, which types of information are stored at the individual field positions of the data set.

In FIG. 2, reference numeral 5 indicates another field declaration. This is apparently a field declaration which is suited for an ordering data set.

The data set proper, for which this field declaration is valid, is designated by reference numeral 6.

As can be seen, the data set 6 has an entirely different field assignment with respect to the data set 1, with fields being also capable of storing different types of information at the same positions. However, it can be seen that there is a coarse subdivision into time, area, person, etc. in the case of the data sets organized in columns, and the fields of each data set are arranged according to such criteria. This coarse subdivivision also regards the columns of the common table. A particular general information type, such as "area", can be subdivided into corresponding subcriteria, such as zip code, place, street, area code, etc. When a data set, such as the data set 1 in FIG. 1, is stored in the common table, it can already be seen by way of the occupied field positions which general information type is concerned in each individual field entry. The exact field declaration, however, can only be recognized by evaluating the definition field 4. Preferably, the definition field 4 is just occupied with a "pointer", which, in turn, refers to a table entry from which the exact field declarations follow for the corresponding data set.

What is claimed is:

1. A database management system for managing the storage of data and retrieval of stored data, with data sets being stored in a table storage means, characterized in that data sets which can have a varying number of occupied fields and different declarations for said occupied fields are stored in a common table, and each data set has a definition field which within the common table characterizes the fields valid for the corresponding data set, as well as the field declarations established for the valid fields, with particular general types of information being allocated to the individual columns of the common table, so that fields of different types of data sets, which jointly relate to a particular general information type, are stored in the same column of the table.

2. The database management system according to claim 1, characterized in that the entry in the definition field of a data set refers to an information data set which contains the complete information with respect to the field declaration that is valid for the data set.

3. The database management system according to claim 2, characterized in that the information data set referred to is a data set stored in the common table.

4. The database management system according to any one of claims 1 to 3, characterized in that the control information required for the operation of the database management system is stored in the form of data sets in the common table.

5. A method of transmitting different types of data sets, comprising the following steps:

generating definition field data for each data set to be transmitted, by which definition field data the fields contained in the corresponding data set are characterized with respect to the information type stored therein, transmitting the data sets with the corresponding definition field data, receiving the transmitted data and storing the different types of data sets in a common table, with a definiton field being derived for each data set, based on the corresponding definition field data, and the definition field being stored together with the corresponding data set in the common table and characterizing the fields valid for the corresponding data set within the common table, as well as the types of information stored therein.

6. The method according to claim 5, characterized in that a data set to be transmitted, including the corresponding definition field data, already represents a data set suited for storage in the common table.

7. The method according to claim 6, characterized in that among the data sets which are to be transmitted and are suited for storage in the common table, there is a data set which contains the transmission specifications.

* * * * *

UNITED STATES PATENT AND TRADEMARK OFFICE
CERTIFICATE OF CORRECTION

| | |
|---|---|
| PATENT NO. | : 6,134,542 |
| DATED | : October 17, 2000 |
| INVENTOR(S) | : Hayno Rustige |

It is certified that error appears in the above-identified patent and that said Letters Patent is hereby corrected as shown below:

<u>Drawings,</u>
FIG. 2b, Sheet 6, replace "ani-als" with -- animals --.

This certificate supersedes Certificate of Correction issued March 12, 2002

Signed and Sealed this

Twenty-fifth Day of June, 2002

*Attest:*

*Attesting Officer*

JAMES E. ROGAN
*Director of the United States Patent and Trademark Office*